(12) United States Patent
Sundaresh et al.

(10) Patent No.: US 9,882,893 B2
(45) Date of Patent: Jan. 30, 2018

(54) SYSTEM AND METHOD FOR SECURED PASSWORD MANAGEMENT FOR INDUSTRIAL DEVICES

(71) Applicant: Honeywell International Inc., Morris Plains, NJ (US)

(72) Inventors: Nagaraja Sundaresh, Hyderabad (IN); Ram Mohan Anugu, Hyderabad (IN); Michael D. Carney, Havertown, PA (US); Rajinikanth Pusala, Hyderabad (IN); Durgaprasad Vallamkonda, Hyderabad (IN)

(73) Assignee: Honeywell International Inc., Morris Plains, NJ (US)

(*) Notice: Subject to any disclaimer, the term of this patent is extended or adjusted under 35 U.S.C. 154(b) by 0 days.

(21) Appl. No.: 14/938,715

(22) Filed: Nov. 11, 2015

(65) Prior Publication Data

US 2017/0078265 A1    Mar. 16, 2017

Related U.S. Application Data

(60) Provisional application No. 62/218,718, filed on Sep. 15, 2015.

(51) Int. Cl.
*H04L 29/06* (2006.01)
*G06F 21/45* (2013.01)

(52) U.S. Cl.
CPC ............ *H04L 63/083* (2013.01); *G06F 21/45* (2013.01)

(58) Field of Classification Search
CPC .................................................... H04L 63/083
(Continued)

(56) References Cited

U.S. PATENT DOCUMENTS 5,816,083 A    10/1998  Bianco
6,833,784 B1   12/2004  Ishii et al.
(Continued)

FOREIGN PATENT DOCUMENTS

KR   10-1998-0030750 A1   12/1998
WO   WO 2005/048015 A2    5/2005

OTHER PUBLICATIONS

The International Searching Authority, "Notification of Transmittal of the International Search Report and the Written Opinion of The International Searching Authority, Or the Declaration," International Application No. PCT/US2016/051020, Dec. 13, 2016, 13 pages, publisher The ISA/KR, International Application Division, Korean Intellectual Property Office, Daejeon, Republic of Korea.

*Primary Examiner* — Christopher Brown (57) ABSTRACT

An industrial process/safety control and automation system is provided. The system includes a user interface device and an industrial device/controller. The user interface device is configured to activate a password set function. The user interface device is also configured to receive a password for transmission to the industrial device/controller. The industrial device/controller is configured to receive the password from the user interface device. The industrial device/controller is also configured to detect a performance of a physical password replacement authentication procedure. The industrial device/controller is further configured to replace a current password with the received password in response to performing the physical password replacement authentication procedure.

20 Claims, 6 Drawing Sheets

(58) Field of Classification Search
USPC .............................................................. 726/6
See application file for complete search history.

(56) References Cited

U.S. PATENT DOCUMENTS

| | | |
|---|---|---|
| 6,871,268 B2 | 3/2005 | Lyengar et al. |
| 7,383,575 B2 | 6/2008 | Cheston et al. |
| 8,433,919 B2 | 4/2013 | Giobbi et al. |
| 8,707,452 B1 * | 4/2014 | Block .................... G06F 21/34 380/30 |
| 2003/0217293 A1 | 11/2003 | Lee |
| 2004/0189439 A1 * | 9/2004 | Cansino ............. G07C 9/00103 340/5.2 |
| 2004/0230809 A1 * | 11/2004 | Lowensohn ............ G06F 21/35 713/186 |
| 2006/0083374 A1 * | 4/2006 | Drake .................... G06F 21/31 380/203 |
| 2008/0046982 A1 | 2/2008 | Parkinson |
| 2010/0050268 A1 | 2/2010 | Sheymov |
| 2013/0333007 A1 | 12/2013 | Chougle et al. |

* cited by examiner

SYSTEM AND METHOD FOR SECURED PASSWORD MANAGEMENT FOR INDUSTRIAL DEVICES

CROSS-REFERENCE TO RELATED APPLICATION AND PRIORITY CLAIM

This application claims priority under 35 U.S.C. §119(e) to U.S. Provisional Patent Application No. 62/218,718 filed on Sep. 15, 2015. This provisional patent application is hereby incorporated by reference in its entirety into this disclosure.

TECHNICAL FIELD

This disclosure relates generally to cybersecurity for an industrial environment. More specifically, this disclosure relates to a system and method for providing secured password management for industrial devices.

BACKGROUND

Various organizations routinely have their own private computing systems, and some of these computing systems can easily include hundreds or thousands of computing devices. These organizations typically want cybersecurity to prevent unauthorized access, modifications, or tampering with safety-critical controls, process controls, and supervisory controls. Many of these controls are protected via one or more passwords.

SUMMARY

This disclosure provides a method and system for providing secured password management for industrial devices.

In a first embodiment, a method to change a password of an industrial device/controller in an industrial process/safety control and automation system is provided. The method includes initiating, by the industrial device/controller, a program mode of the industrial device/controller. The method also includes receiving, by the industrial device/controller, a password from a user interface device during the program mode. The method further includes after receiving the password, initiating, by the industrial device/controller, a lock mode of the industrial device/controller. In addition, the method includes replacing, by the industrial device/controller, a current password of the industrial device/controller with the received password.

In a second embodiment, an industrial device/controller in an industrial process/safety control and automation system is provided. The industrial device/controller is configured to initiate a program mode of the industrial device/controller. The industrial device/controller is also configured to receive a password from a user interface device during the program mode. The industrial device/controller is further configured, after receiving the password, to initiate a lock mode of the industrial device/controller. In addition, the industrial device/controller is configured to replace a current password of the industrial device/controller with the received password.

In a third embodiment, an industrial process/safety control and automation system is provided. The system includes a user interface device and an industrial device/controller. The user interface device is configured to activate a password set function. The user interface device is also configured to receive a password for transmission to the industrial device/controller. The industrial device/controller is configured to receive the password from the user interface device. The industrial device/controller is also configured to detect a performance of a physical password replacement authentication procedure. The industrial device/controller is further configured to replace a current password with the received password in response to performing the physical password replacement authentication procedure.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 7, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Many organizations typically want cybersecurity to prevent unauthorized access, modifications, or tampering with safety-critical controls, process/safety controls, and supervisory controls. Some organizations use passwords to protect these controls. However, an organization may experience issues if a password is forgotten, obtained without authorization, or misplaced. Such an occurrence can require a plant shutdown and an entire memory of a controller to be wiped out in order to reset the password. This can result in a loss of plant control as well as a loss in plant configuration when a correct configuration version is running but is not separately backed-up. In addition, some systems relying on passwords allow remote users to perform password management operations, which are at a high security level. Such remote mechanisms can be exploited by malicious users.

Systems and methods for secured password management for industrial devices are discussed herein. These systems and methods increase the security level for performing password management (such as password reset, password change, and the like) by introducing one or more additional checks to prove that a user is not malicious. In some embodiments, such checks can be done using a physical access at a device, such as key-switches or the like. Note that in the following discussion, the systems and methods are described with respect to use in conjunction with an industrial process/safety control and automation system. However, the systems and methods could be used with any suitable computing system and are not limited to use in industrial control and automation settings.

Figure 1:
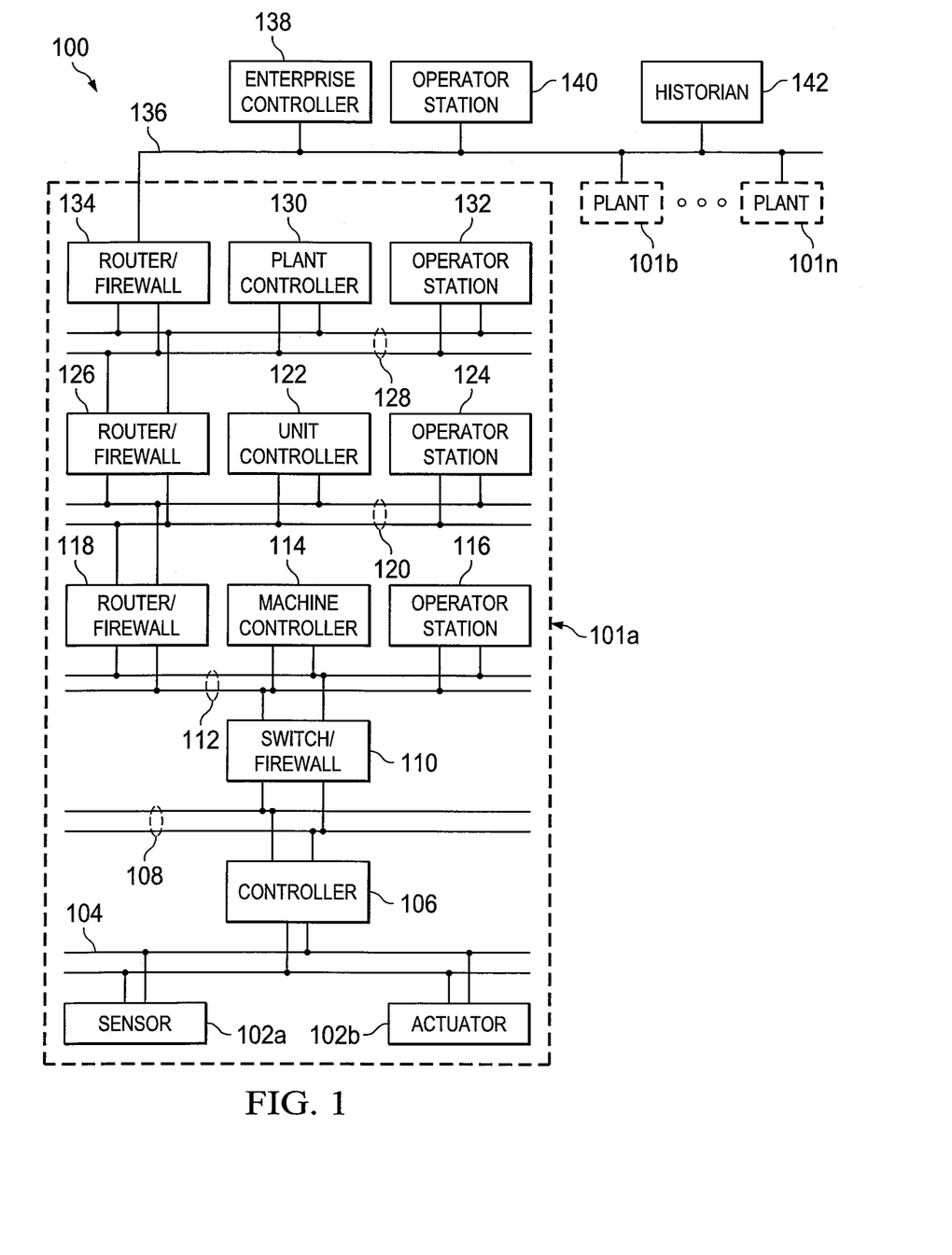
FIG. 1 illustrates an example industrial process/safety control and automation system according to this disclosure.

FIG. 1 illustrates an example industrial process/safety control and automation system 100 according to this disclosure. As shown in FIG. 1, the system 100 includes various components that facilitate production or processing of at least one product or other material. For instance, the system 100 is used here to facilitate control over components in one or multiple plants 101a-101n. Each plant 101a-101n represents one or more processing facilities (or one or more portions thereof), such as one or more manufacturing facilities for producing at least one product or other material. In general, each plant 101a-101n may implement one or more processes and can individually or collectively be referred to as a process/safety system. A process system generally represents any system or portion thereof configured to process one or more products or other materials in some manner.

In FIG. 1, the system 100 is implemented using the Purdue model of process control. In the Purdue model, "Level 0" may include one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, or flow rate. Also, the actuators 102b could alter a wide variety of characteristics in the process system. The sensors 102a and actuators 102b could represent any other or additional components in any suitable process system. Each of the sensors 102a includes any suitable structure for measuring one or more characteristics in a process system. Each of the actuators 102b includes any suitable structure for operating on or affecting one or more conditions in a process system.

Redundant networks 104 are coupled to the sensors 102a and actuators 102b. The networks 104 facilitate interaction with the sensors 102a and actuators 102b. For example, the networks 104 could transport measurement data from the sensors 102a and provide control signals to the actuators 102b. The networks 104 could represent any suitable redundant networks. As particular examples, the networks 104 could represent redundant IEC-61850, IEC-62439, Ethernet/IP (EIP), or MODBUS/TCP networks. The networks 104 can have any suitable configuration, such as a star or ring topology.

In the Purdue model, "Level 1" includes one or more controllers 106, which are coupled to the networks 104. Among other things, each controller 106 may use the measurements from one or more sensors 102a to control the operation of one or more actuators 102b. Each controller 106 includes any suitable structure for controlling one or more aspects of a process system. As a particular example, each controller 106 could represent a computing device.

Redundant networks 108 are coupled to the controllers 106. The networks 108 facilitate interaction with the controllers 106, such as by transporting data to and from the controllers 106. The networks 108 could represent any suitable redundant networks. As particular examples, the networks 108 could represent a pair of Ethernet networks or a redundant pair of Ethernet networks, such as a FAULT TOLERANT ETHERNET (FTE) network from HONEYWELL INTERNATIONAL INC.

At least one switch/firewall 110 couples the networks 108 to two networks 112. The switch/firewall 110 may transport traffic from one network to another. The switch/firewall 110 may also block traffic on one network from reaching another network. The switch/firewall 110 includes any suitable structure for providing communication between networks, such as a HONEYWELL CONTROL FIREWALL (CF9) device. The networks 112 could represent any suitable networks, such as a pair of Ethernet networks or an FTE network.

In the Purdue model, "Level 2" may include one or more machine-level controllers 114 coupled to the networks 112. The machine-level controllers 114 perform various functions to support the operation and control of the controllers 106, sensors 102a, and actuators 102b, which could be associated with a particular piece of industrial equipment (such as a boiler or other machine). For example, the machine-level controllers 114 could log information collected or generated by the controllers 106, such as measurement data from the sensors 102a or control signals for the actuators 102b. The machine-level controllers 114 could also execute applications that control the operation of the controllers 106, thereby controlling the operation of the actuators 102b. In addition, the machine-level controllers 114 could provide secure access to the controllers 106. Each of the machine-level controllers 114 includes any suitable structure for providing access to, control of, or operations related to a machine or other individual piece of equipment. Each of the machine-level controllers 114 could, for example, represent a server computing device running a MICROSOFT WINDOWS operating system. Although not shown, different machine-level controllers 114 could be used to control different pieces of equipment in a process system (where each piece of equipment is associated with one or more controllers 106, sensors 102a, and actuators 102b).

One or more operator stations 116 are coupled to the networks 112. The operator stations 116 represent computing or communication devices providing user access to the machine-level controllers 114, which could then provide user access to the controllers 106 (and possibly the sensors 102a and actuators 102b). As particular examples, the operator stations 116 could allow users to review the operational history of the sensors 102a and actuators 102b using information collected by the controllers 106 and/or the machine-level controllers 114. The operator stations 116 could also allow the users to adjust the operation of the sensors 102a, actuators 102b, controllers 106, or machine-level controllers 114. In addition, the operator stations 116 could receive and display warnings, alerts, or other messages or displays generated by the controllers 106 or the machine-level controllers 114. Each of the operator stations 116 includes any suitable structure for supporting user access and control of one or more components in the system 100. Each of the operator stations 116 could, for example, represent a computing device running a MICROSOFT WINDOWS operating system.

At least one router/firewall 118 couples the networks 112 to two networks 120. The router/firewall 118 includes any suitable structure for providing communication between networks, such as a secure router or combination router/firewall. The networks 120 could represent any suitable networks, such as a pair of Ethernet networks or an FTE network.

In the Purdue model, "Level 3" may include one or more unit-level controllers 122 coupled to the networks 120. Each unit-level controller 122 is typically associated with a unit in a process system, which represents a collection of different machines operating together to implement at least part of a process. The unit-level controllers 122 perform various functions to support the operation and control of components in the lower levels. For example, the unit-level controllers 122 could log information collected or generated by the components in the lower levels, execute applications that control the components in the lower levels, and provide secure access to the components in the lower levels. Each of the unit-level controllers 122 includes any suitable structure for providing access to, control of, or operations related to one or more machines or other pieces of equipment in a process unit. Each of the unit-level controllers 122 could, for example, represent a server computing device running a MICROSOFT WINDOWS operating system. Although not shown, different unit-level controllers 122 could be used to control different units in a process system (where each unit is associated with one or more machine-level controllers 114, controllers 106, sensors 102a, and actuators 102b).

Access to the unit-level controllers 122 may be provided by one or more operator stations 124. Each of the operator stations 124 includes any suitable structure for supporting user access and control of one or more components in the system 100. Each of the operator stations 124 could, for example, represent a computing device running a MICROSOFT WINDOWS operating system.

At least one router/firewall 126 couples the networks 120 to two networks 128. The router/firewall 126 includes any suitable structure for providing communication between networks, such as a secure router or combination router/firewall. The networks 128 could represent any suitable networks, such as a pair of Ethernet networks or an FTE network.

In the Purdue model, "Level 4" may include one or more plant-level controllers 130 coupled to the networks 128. Each plant-level controller 130 is typically associated with one of the plants 101a-101n, which may include one or more process units that implement the same, similar, or different processes. The plant-level controllers 130 perform various functions to support the operation and control of components in the lower levels. As particular examples, the plant-level controller 130 could execute one or more manufacturing execution system (MES) applications, scheduling applications, or other or additional plant or process control applications. Each of the plant-level controllers 130 includes any suitable structure for providing access to, control of, or operations related to one or more process units in a process plant. Each of the plant-level controllers 130 could, for example, represent a server computing device running a MICROSOFT WINDOWS operating system.

Access to the plant-level controllers 130 may be provided by one or more operator stations 132. Each of the operator stations 132 includes any suitable structure for supporting user access and control of one or more components in the system 100. Each of the operator stations 132 could, for example, represent a computing device running a MICROSOFT WINDOWS operating system.

At least one router/firewall 134 couples the networks 128 to one or more networks 136. The router/firewall 134 includes any suitable structure for providing communication between networks, such as a secure router or combination router/firewall. The network 136 could represent any suitable network, such as an enterprise-wide Ethernet or other network or all or a portion of a larger network (such as the Internet).

In the Purdue model, "Level 5" may include one or more enterprise-level controllers 138 coupled to the network 136. Each enterprise-level controller 138 is typically able to perform planning operations for multiple plants 101a-101n and to control various aspects of the plants 101a-101n. The enterprise-level controllers 138 can also perform various functions to support the operation and control of components in the plants 101a-101n. As particular examples, the enterprise-level controller 138 could execute one or more order processing applications, enterprise resource planning (ERP) applications, advanced planning and scheduling (APS) applications, or any other or additional enterprise control applications. Each of the enterprise-level controllers 138 includes any suitable structure for providing access to, control of, or operations related to the control of one or more plants. Each of the enterprise-level controllers 138 could, for example, represent a server computing device running a MICROSOFT WINDOWS operating system. In this document, the term "enterprise" refers to an organization having one or more plants or other processing facilities to be managed. Note that if a single plant 101a is to be managed, the functionality of the enterprise-level controller 138 could be incorporated into the plant-level controller 130.

Access to the enterprise-level controllers 138 may be provided by one or more operator stations 140. Each of the operator stations 140 includes any suitable structure for supporting user access and control of one or more components in the system 100. Each of the operator stations 140 could, for example, represent a computing device running a MICROSOFT WINDOWS operating system.

A historian 142 is also coupled to the network 136 in this example. The historian 142 could represent a component that stores various information about the system 100. The historian 142 could, for example, store information used during production scheduling and optimization. The historian 142 represents any suitable structure for storing and facilitating retrieval of information. Although shown as a single centralized component coupled to the network 136, the historian 142 could be located elsewhere in the system 100, or multiple historians could be distributed in different locations in the system 100.

Cybersecurity is increasingly becoming a focus in industrial environments. At the heart of industrial control are embedded devices that perform safety-critical control, process control, and supervisory control. This disclosure describes an innovative technique to secure passwords in industrial control devices like controllers, input/output (IO) units, programmable automation controllers (PACs), programmable logic controllers (PLCs), or operator interfaces. The disclosure provides algorithms that make use of physical access to a device as an additional factor of authentication to allow secured access to industrial control devices and the performance of critical password-related operations. Typically, devices in an industrial environment that are critical to control (like controllers, IOs, switches, or the like) are placed in a physically-secured environment, such as a locked cabinet or a control room with electronic access control. The devices could also include a mode key switch or other mechanism on the devices to physically lock the devices. Thus, physical security can act as a good security addition and can act as a strong defense to remote attacks to the industrial devices.

Increasingly, more vendors are adding protection for process control devices from unauthorized access/modification. Many critical aspects of an industrial device are protected by a password mechanism. Examples of industrial device operations protected by a password can include modification of a program running on the industrial device, performing changes by monitoring the program, modification of firmware in the industrial device, changing the industrial device's mode, or changing critical industrial device system parameters such as time, network configuration, or the like.

While many vendors provide password protection for industrial device operations, customers face a big problem if they forget an industrial device password. Typically, this requires a user to shut down a plant and wipe out the entire memory of the device to reset its password. This often results in loss of control in the plant and loss of configuration if the correct running version of the device's configuration is not backed up separately. Although a full wipe of the industrial device's configuration might be a secure solution, it is a substantial inconvenience to the customer who has genuinely lost the password. Many customers have processes and mechanisms in place to physically secure the industrial device, and physical access to the industrial device could in that case override all other security mechanisms placed on the industrial device.

As discussed herein, physical security can be placed on an industrial device to either (i) override other soft access mechanisms (such as a password) and provide a more user-friendly way to secure the industrial device, or (ii) use the physical security as a second factor authentication to enhance the security of the device. Examples of physical security mechanisms include placing a device in an access-controlled room (such as a room with an electronic or physical lock), placing the device in a cabinet with a physical lock, or placing a physical lock on the device itself. This therefore helps to augment the password protection provided by the device.

To accomplish this, any of the devices in the system 100 (such as any of the process controllers, routers, switches, or firewalls) can use a password to protect unauthorized access to critical functions of the device. That password protection is augmented with physical access to the device (such as using a physical key switch), which improves user experience in cases where the password is lost. As an example of this functionality, a controller or other device can be protected with a password. In order to secure the password against unauthorized changes, a physical key switch on the device is used. The key mechanism can prevent remote malicious users from tampering with the device.

There are various ways of utilizing physical access to enhance password protection. For example, password protection can be enhanced by making use of rules an additional factor of authentication. In some embodiments, the following rules can be applied to protect a device from unauthorized password modifications. A first rule indicates that a password cannot be changed unless a key on the device is switched to a particular mode (such as a program mode). This rule helps to ensure that a password change cannot even be attempted if the key is in an incorrect position, such as a position associated with normal runtime operation of the device during normal operation of a plant or a mandatory position to run the device in a safety mode. A second rule indicates that a password can be changed while the controller is in a first mode but the change would take effect only after the key switch is turned from that mode to a second mode (such as a run lock mode). This rule helps to ensure that, even if the device is left running in the first mode, a password change cannot be committed into the device until the key switch is turned to the second mode.

As another example, password protection can be enhanced by using physical access to a device as an override to the password mechanism, thus improving the user experience in accessing the device when the password is forgotten. In some embodiments, a device in the system 100 can include a function block that displays all password-related events. This feature can be used to generate alarms so that any malicious activity can be detected. A device (such as a controller or other component) can monitor how many times unauthorized access attempts are made for functions such as device password sets, device password disables, device control operations, and the like. Parameters related to password operations can be monitored on a supervisory control and data acquisition (SCADA) system or other system for alarming and notification procedures.

Although FIG. 1 illustrates one example of an industrial process control and automation system 100, various changes may be made to FIG. 1. For example, industrial control and automation systems come in a wide variety of configurations. The system 100 shown in FIG. 1 is meant to illustrate one example operational environment in which certain functionalities can be used. However, FIG. 1 does not limit this disclosure to any particular configuration or operational environment. Also, as noted above, the techniques described in this patent document could be used with any suitable computing system and are not limited to use with industrial process control and automation systems.

Figure 2:
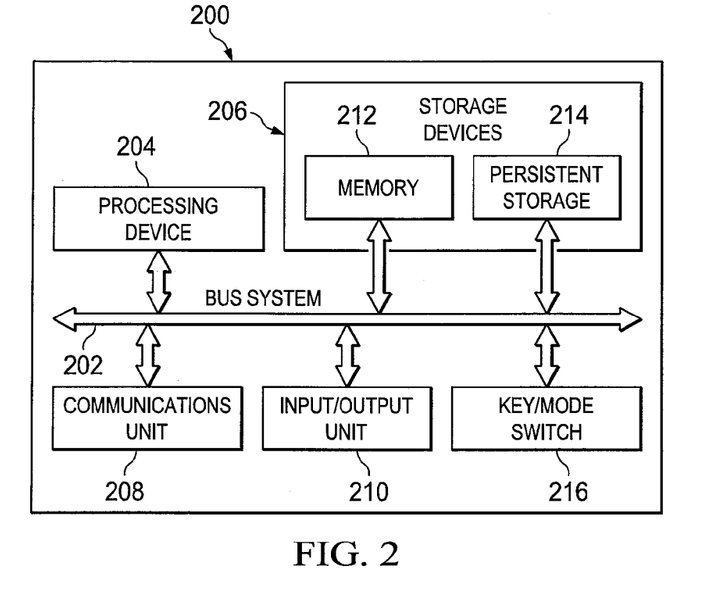
FIG. 2 illustrates an example device supporting secured password management for industrial devices according to this disclosure.

FIG. 2 illustrates an example device 200 supporting secured password management for industrial devices according to this disclosure. The device 200 could, for example, represent any suitable computing device in the system 100 of FIG. 1. For example, the device 200 could represent any of the controllers or other devices illustrated in FIG. 1.

As shown in FIG. 2, the device 200 includes a bus system 202, which supports communication between at least one processing device 204, at least one storage device 206, at least one communications unit 208, and at least one input/output (I/O) unit 210. The processing device 204 executes instructions that may be loaded into a memory 212. The processing device 204 may include any suitable number(s) and type(s) of processors or other devices in any suitable arrangement. Example types of processing devices 204 include microprocessors, microcontrollers, digital signal processors, field programmable gate arrays, application specific integrated circuits, and discrete circuitry.

The memory 212 and a persistent storage 214 are examples of storage devices 206, which represent any structure(s) capable of storing and facilitating retrieval of information (such as data, program code, and/or other suitable information on a temporary or permanent basis). The memory 212 may represent a random access memory or any other suitable volatile or non-volatile storage device(s). The persistent storage 214 may contain one or more components or devices supporting longer-term storage of data, such as a ready only memory, hard drive, Flash memory, or optical disc.

The communications unit 208 supports communications with other systems or devices. For example, the communications unit 208 could include a network interface card that facilitates communications over at least one Ethernet network. The communications unit 208 could also include a wireless transceiver facilitating communications over at least one wireless network. The communications unit 308 may support communications through any suitable physical or wireless communication link(s).

The I/O unit 210 allows for input and output of data. For example, the I/O unit 210 may provide a connection for user input through a keyboard, mouse, keypad, touchscreen, or other suitable input device. The I/O unit 210 may also send output to a display, printer, or other suitable output device.

The device 200 also includes at least one physical security mechanism, such as a key or mode switch 216. As described above, the key or mode switch 216 could be used to enhance password security related to the device 200. For example, access to the key or mode switch 216 may be required in order to set or change a password of the device 200, or the key or mode switch 216 could be used to override the password protection in the event the device's password is forgotten. The key or mode switch 216 represents any suitable control requiring physical operation.

Although FIG. 2 illustrates one example of a device 200 supporting secured password management for industrial devices, various changes may be made to FIG. 2. For example, various components in FIG. 2 could be combined, further subdivided, or omitted and additional components could be added according to particular needs. Also, computing devices can come in a wide variety of configurations, and FIG. 2 does not limit this disclosure to any particular configuration of computing device.

Figure 3:
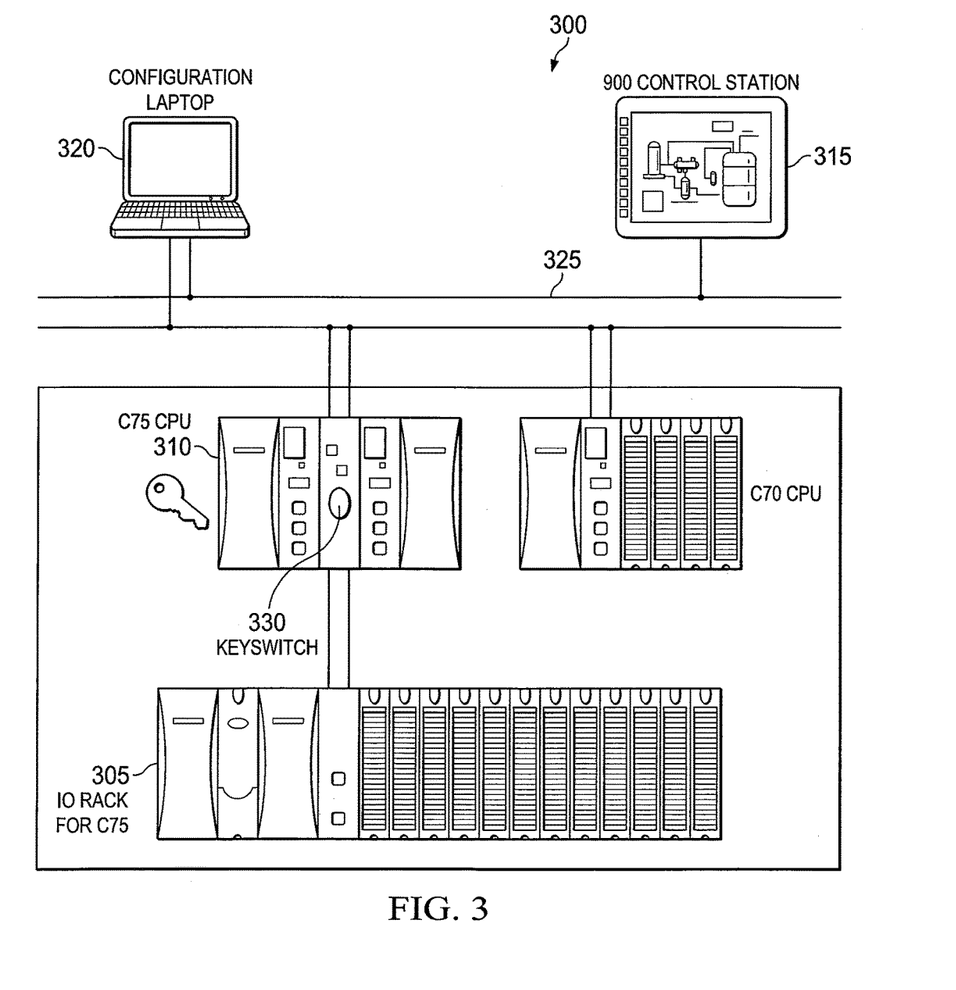
FIGS. 3 and 4 illustrate example systems for providing secured password management for industrial devices according to this disclosure.

FIG. 3 illustrates an example system 300 for providing secured password management for industrial devices according to this disclosure. The system 300 could, for example, represent any suitable computing system including system 100 of FIG. 1. The components in system 300 could also represent any of the controllers or other devices illustrated in FIG. 1.

In some embodiments, the system 300 can be a HONEYWELL HC900 system. As shown in FIG. 3, the system 300 includes a controller 305 (such as an HC900 controller) with an I/O device 310 (such as an HC900 I/O device), an operator touch panel 315, and operator station 320. The controller 305 is communicatively linked to the operator touch panel 315 and the operator station 320 via a network 325. The controller 305 also includes a keyswitch 330. The keyswitch 330 is actuated to one or more different positions to reset a password of the controller 305, electronically access the controller 305, or the like. The keyswitch 330 can be actuated when a physical key is inserted into the keyswitch 330. The system 300 including the controller 305 with the keyswitch 330 can prevent a remote malicious user from tampering with the controller 305.

Although FIG. 3 illustrates one example of a system 300 supporting secured password management for industrial devices, various changes may be made to FIG. 3. For example, various components in FIG. 3 could be combined, further subdivided, or omitted and additional components could be added according to particular needs. Also, computing devices and computing device systems can come in a wide variety of configurations, and FIG. 3 does not limit this disclosure to any particular configuration of computing device or computing device system.

Figure 4:
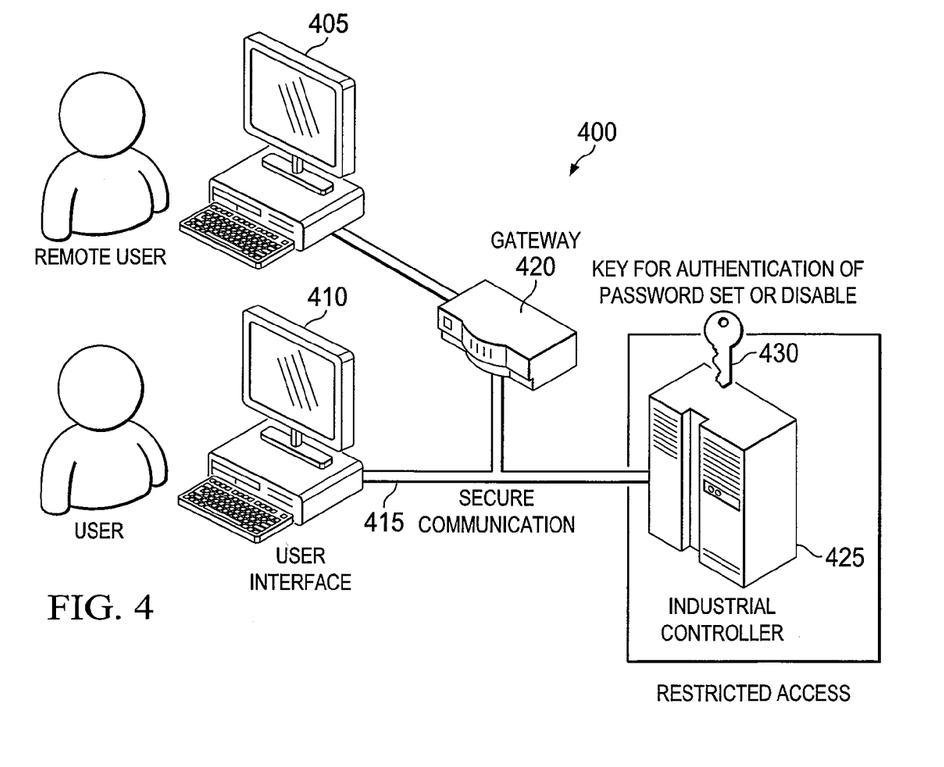

FIG. 4 illustrates an example system 400 for providing secured password management for industrial devices according to this disclosure. The system 400 could, for example, represent any suitable computing system including system 100 of FIG. 1 and system 300 of FIG. 3. The components in system 400 could also represent any of the controllers or other devices illustrated in FIG. 1 and FIG. 3.

As shown in FIG. 4, the system 400 includes a remote user interface device 405, a user interface device 410, and a secure communication network 415 communicatively connecting the remote user interface device 405 and the user interface device 410 with an industrial controller 425. The remote user interface device 405 can be communicatively connected to the secure communication network 415 via a gateway 420.

The industrial controller 425 also includes a keyswitch 430 configured to receive a key to protect the industrial controller 425 from unauthorized password modification. When the keyswitch 430 receives a key, the keyswitch 430 can be actuated between at least a RUN/PROGRAM (RUN/PGM) mode position and a RUN/LOCK mode position. For example, the keyswitch 430 can normally be in the RUN/LOCK mode position so that a password to access the industrial controller 425 cannot be changed. When the keyswitch 430 is in the RUN/LOCK mode position, a password change cannot be attempted and the controller can safely operate under normal operating conditions.

Subsequently, the keyswitch 430 can receive a key. After the keyswitch 430 receives a key, the keyswitch 430 can be actuated to the RUN/PGM mode position. The remote user interface device 405 or the user interface device 410 can transmit a new password to the industrial controller 425. The industrial controller 425 will receive the new password because the keyswitch 430 is the RUN/PGM mode position. After the industrial controller 425 receives the new password from either the remote user interface device 405 or the user interface device 410, the industrial controller 425 will not replace a current password of the industrial controller 425 with the new password as long as the keyswitch 430 remains in the RUN/PGM mode position. After the industrial controller 425 receives the new password from either the remote user interface device 405 or the user interface device 410, the industrial controller 425 replaces the current password of the industrial controller 425 with the new password after the keyswitch 430 actuates back to the RUN/LOCK mode position. This ensures that even if the industrial controller 425 is left running while the keyswitch 430 is in the RUN/PGM mode position, a password change cannot be made for the industrial controller 425 until the keyswitch 430 is actuated to the RUN/LOCK mode position. In an embodiment, the keyswitch 430 may not be physically attached to the industrial controller 425. Instead, the keyswitch 430 may be hidden or stored in a separate secure location accessible only to authorized users of the industrial controller 425.

Although FIG. 4 illustrates one example of a system 400 supporting secured password management for industrial devices, various changes may be made to FIG. 4. For example, various components in FIG. 4 could be combined, further subdivided, or omitted and additional components could be added according to particular needs. Also, computing devices and computing device systems can come in a wide variety of configurations, and FIG. 4 does not limit this disclosure to any particular configuration of computing device or computing device system.

Figure 5:
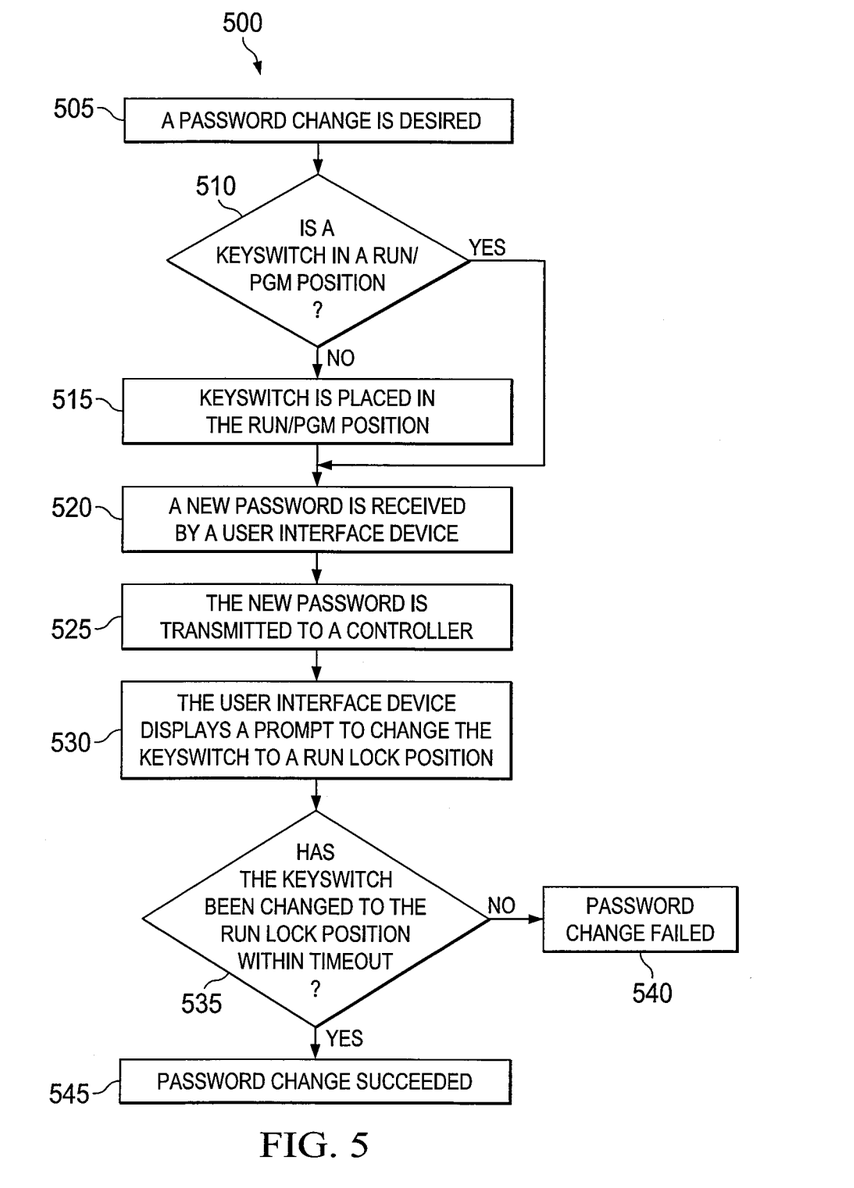
FIGS. 5, 6, and 7 illustrate example methods for providing secured password management according to this disclosure.

FIG. 5 illustrates an example method 500 for providing secured password management according to this disclosure. The method illustrated in FIG. 5 can be implemented, for example, in system 100 of FIG. 1, system 300 in FIG. 3, or system 400 in FIG. 4. Method 500 will be described herein with reference to system 400 of FIG. 4.

At step 505, a password change for an industrial controller 425 in a system 400 is desired. A key can also be placed in a keyswitch 430 of the industrial controller 425. At step 510, the industrial controller 425 determines whether the keyswitch 430 is in a RUN/PGM mode position. If the keyswitch 430 is not in the RUN/PGM mode position, then, at step 515, the keyswitch 430 is actuated to the RUN/PGM mode position. In an embodiment, a key inserted into the keyswitch 430 allows the keyswitch 430 to be actuated. Otherwise, if the keyswitch 430 is in the RUN/PGM mode position, then, at step 520, a new password is received by at least one of a remote user interface device 405 or a user interface device 410. At step 525, the new password is transmitted from the user interface device 410 via a secure communications network 415 and is received by the industrial controller 425.

At step 530, at least one of the remote user interface device 405 or the user interface device 410 displays a prompt to change the keyswitch 430 from the RUN/PGM mode position to the RUN/LOCK mode position. For example, after receiving the new password while detecting that the keyswitch 430 is in the RUN/PGM mode position, the industrial controller 425 transmits a signal, via the secure communication network 415, to the user interface device 410 commanding the user interface device 410 to display the prompt to change the keyswitch 430 from the RUN/PGM mode position to the RUN/LOCK mode position. The command can also cause the user interface device 410 to display a history of unauthorized access or unsuccessful password change attempts (such as invalid passwords) to the industrial controller 425. At step 535, the industrial controller 425 determines whether the keyswitch 430 has been changed from the RUN/PGM mode position to the RUN/LOCK mode position.

It should be understood that the industrial controller 425 detects when the keyswitch 430 is actuated to the RUN/PGM mode position and initiates a RUN/PGM mode of the industrial controller 425. When the industrial controller 425 is in the RUN/PGM mode, the industrial controller 425 is able to receive a password to replace a current password of the industrial controller 425. It should be understood that the industrial controller 425 detects when the keyswitch 430 is actuated to the RUN/LOCK mode position and initiates a RUN/LOCK mode of the industrial controller 425. When the industrial controller 425 is in the RUN/LOCK mode, the industrial controller 425 cannot receive a password to replace a current password of the industrial controller 425.

If the industrial controller 425 determines that the keyswitch 430 has not been changed from the RUN/PGM mode position to the RUN/LOCK mode position, then, at step 540, the industrial controller 425 determines that the password change has failed or that the password change has not yet been implemented. A failure of a password change can be defined as failing to replace a current password of the industrial controller 425 with the new password received by the industrial controller 425. In an embodiment, the industrial controller 425 determines that the keyswitch 430 has not been changed from the RUN/PGM mode position to the RUN/LOCK mode position after a predetermined time from transmitting the signal to displaying the prompt and determines that the password change has failed. If the industrial controller 425 determines that the keyswitch 430 has been changed from the RUN/PGM mode position to the RUN/LOCK mode position, then, at step 545, the industrial controller 425 determines that the password change has succeeded. A password change success can be defined as replacing a current password of the industrial controller with a new password.

Although FIG. 5 illustrates one example of a method 500, various changes may be made to FIG. 5. For example, while shown as a series of steps, various steps shown in FIG. 5 could overlap, occur in parallel, occur in a different order, or occur multiple times. Moreover, some steps could be combined or removed and additional steps could be added according to particular needs.

Figure 6:
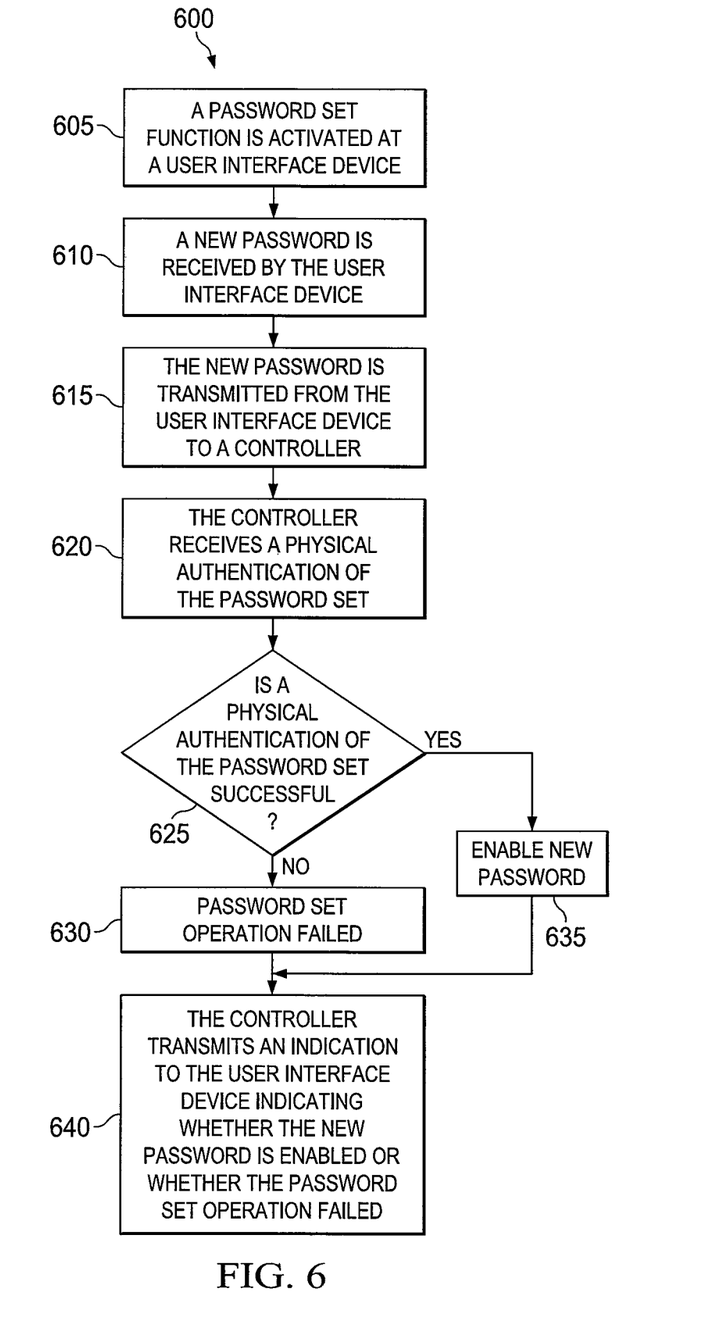

FIG. 6 illustrates an example method 600 for providing secured password management according to this disclosure. In an embodiment, the keyswitch 430 can be used a physical access override to set or change the password of the industrial controller 425. Method 600 will be described herein with reference to system 400 of FIG. 4.

As shown in FIG. 6, at step 605, a user interface device 410 receives a command to activate a password setting function to set or change a password of an industrial controller 425. After receiving the command to activate the password setting function, at step 610, a new password is received by the user interface device 410. At step 615, the new password is transmitted, by the user interface device 410, to the industrial controller 425, via a secure communications network 415.

At step 620, the industrial controller 425 receives a physical authentication of a password set or change. The physical authentication of the password set or change can include at least one of inserting a key into a keyswitch 430 of the industrial controller 425 or actuating the keyswitch 430 from a RUN/LOCK mode position to a RUN/PGM mode position. It should be understood that the keyswitch 430 can be physically located on the industrial controller 425 or the keyswitch 430 can be physically located at a secret or secure location different from the location of the industrial controller 425.

At step 625, the industrial controller 425 determines whether the physical authentication of the password is successful. If the industrial controller 425 determines that the physical authentication of the password is not successful, then, at step 630, the industrial controller 425 determines that the password set or change operation has failed. If the industrial controller 425 determines that the physical authentication of the password is successful, then, at step 635, the industrial controller 425 replaces a current password of the industrial controller 425 with the new received password.

At step 640, the industrial controller 425 transmit an indication to the user interface device 410 indicating whether the password set or change operation is successful. For example, if the industrial controller 425 determines that the password set or change operation has failed, then the industrial controller 425 transmits an indication to the user interface device 410 indicating that the operation has failed. If the industrial controller 425 determines that the password set or change operation was successful and the new password has been implemented for the industrial controller 425, then the industrial controller 425 transmits an indication to the user interface device 410 indicating that the operation was successful. In an embodiment, the industrial controller 425 transmits a command to the user interface device 410 to generate for display a history of instances or occurrences when a password set or change operation was not successful. This can occur, for example, when the industrial controller 425 transmits the indication to the user interface device 410 indicating whether the password set or change operation is successful.

Although FIG. 6 illustrates one example of a method 600, various changes may be made to FIG. 6. For example, while shown as a series of steps, various steps shown in FIG. 6 could overlap, occur in parallel, occur in a different order, or occur multiple times. Moreover, some steps could be combined or removed and additional steps could be added according to particular needs.

Figure 7:
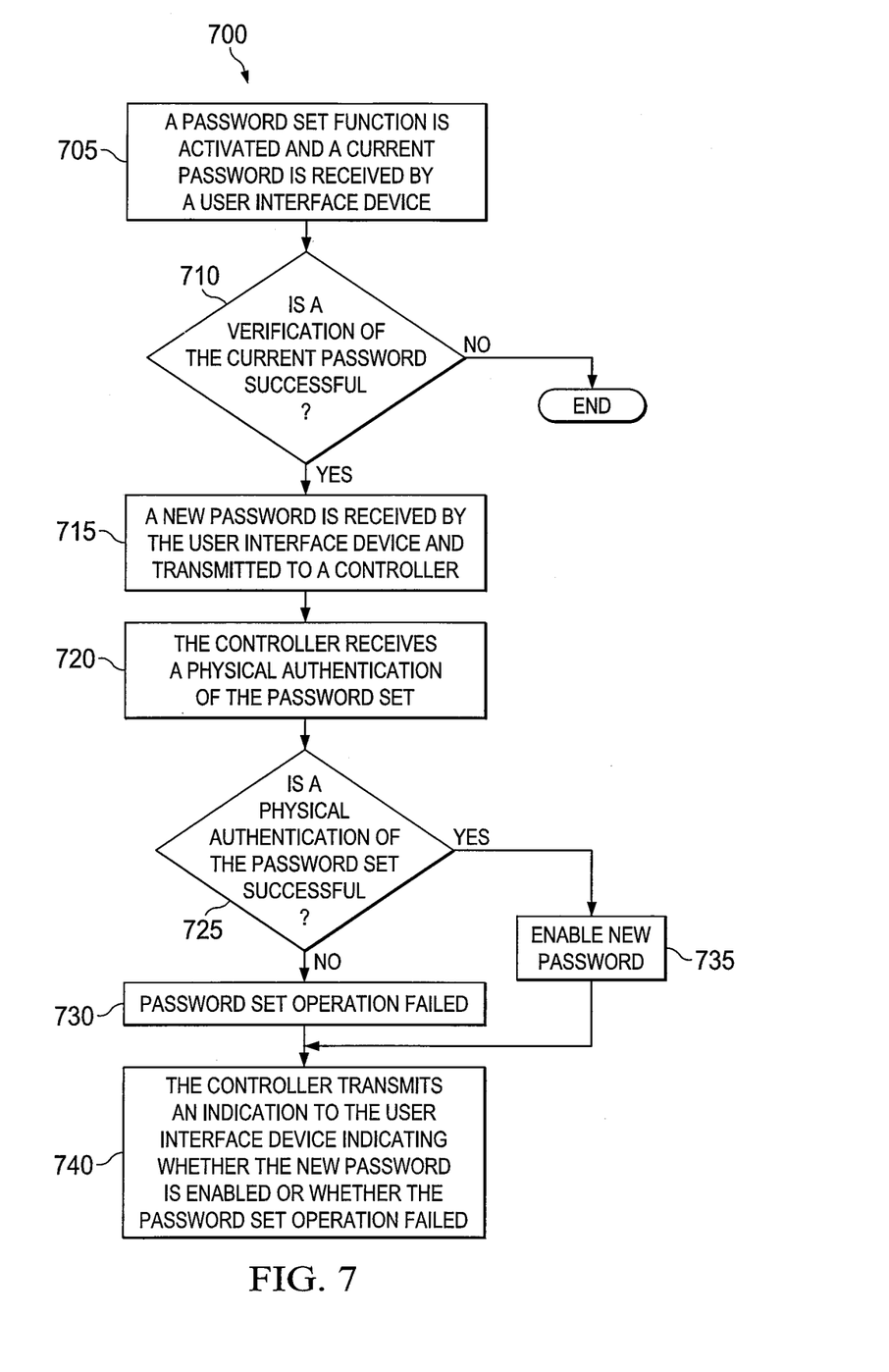

FIG. 7 illustrates an example method 700 for providing secured password management according to this disclosure. In an embodiment, the keyswitch 430 can be used as an additional authentication factor to set or change the password of the industrial controller 425. Method 700 will be described herein with reference to system 400 of FIG. 4.

As shown in FIG. 7, at step 705, a user interface device 410 receives a command to activate a password setting function to set or change a password of an industrial controller 425, and a current password of an industrial controller 425 to communicatively access the industrial controller 425 is received by the user interface device 410. At step 710, the user interface device 410 performs a verification to determine whether the received password is a current password of the industrial controller 425. If the user interface device 410 determines the received password does not match the current password of the industrial controller 425, then the user interface device 410 ends the operation. In an embodiment, the user interface device 410 can generate for display a history of instances or occurrences when the received password did not match the current password. This can occur, for example, in response to the user interface device 410 receiving a password that does not match the current password of the industrial controller 425.

Otherwise, if the user interface device 410 determines that the received password is the current password of the industrial controller 425, then, at step 715, the user interface device 410 displays an input window, receives a new password, and transmits the new password to the industrial controller 425 via a secure communication network 415. At step 720, the industrial controller 425 receives a physical authentication of the password set or change. The physical authentication of the password set or change can include at least one of inserting a key into a keyswitch 430 of the industrial controller 425 or actuating the keyswitch 430 from a RUN/LOCK mode position to a RUN/PGM mode position.

At step 725, the industrial controller 425 determines whether the physical authentication of the password is successful. If the industrial controller 425 determines that the physical authentication of the password is not successful, then, at step 730, the industrial controller 425 determines that the password set or change operation has failed. If the industrial controller 425 determines that the physical authentication of the password is successful, then, at step 735, the industrial controller 425 replaces a current password of the industrial controller 425 with the new received password.

At step 740, the industrial controller 425 transmits an indication to the user interface device 410 indicating whether the password set or change operation is successful. For example, if the industrial controller 425 determines that the password set or change operation has failed, then the industrial controller 425 transmits an indication to the user interface device 410 indicating that the operation has failed. If the industrial controller 425 determines that the password set or change operation was successful and the new password has been implemented for the industrial controller 425, then the industrial controller 425 transmits an indication to the user interface device 410 indicating that the operation was successful. In an embodiment, the industrial controller 425 transmits a command to the user interface device 410 to generate for display a history of instances or occurrences when a password set or change operation was not successful. This can occur, for example, when the industrial controller 425 transmits the indication to the user interface device 410 indicating whether the password set or change operation is successful.

Although FIG. 7 illustrates one example of a method 700, various changes may be made to FIG. 7. For example, while shown as a series of steps, various steps shown in FIG. 7 could overlap, occur in parallel, occur in a different order, or occur multiple times. Moreover, some steps could be combined or removed and additional steps could be added according to particular needs.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method to change a password of an industrial device/controller in an industrial process/safety control and automation system, the method comprising:
   initiating, by the industrial device/controller, a program mode of the industrial device/controller in response to detecting an actuation of a keyswitch from a lock mode position to a program mode position;
   receiving, by the industrial device/controller, a password from a user interface device during the program mode;
   after receiving the password, initiating, by the industrial device/controller, a lock mode of the industrial device/controller in response to detecting an actuation of the keyswitch from the program mode position to the lock mode position; and
   replacing, by the industrial device/controller, a current password of the industrial device/controller with the received password in response to the lock mode being initiated within a predetermined amount of time after receiving the password;
   wherein the industrial device/controller is configured to maintain the current password and disregard the received password in response to the lock mode not being initiated within the predetermined amount of time after receiving the password.

2. The method of claim 1, wherein the keyswitch is located on the industrial device/controller.

3. The method of claim 1, further comprising transmitting an indication to the user interface device indicating that the current password of the industrial device/controller has been replaced with the received password after replacing the current password of the industrial device/controller with the received password.

4. The method of claim 1, further comprising transmitting, by the industrial device/controller, a history of unsuccessful password replacement attempts after the industrial device/controller receives the password.

5. The method of claim 1, further comprising:
after receiving the password, transmitting, by the industrial device/controller, a command to the user interface device to display a prompt to actuate the keyswitch from the program mode position to the lock mode position.

6. The method of claim 4, further comprising:
transmitting, by the industrial device/controller, a command to the user interface device to display the history of unsuccessful password replacement attempts.

7. An industrial device/controller for use in an industrial process/safety control and automation system, the industrial device/controller comprising:
at least one processing device configured to:
initiate a program mode of the industrial device/controller in response to detecting an actuation of a keyswitch from a lock mode position to a program mode position;
receive a password from a user interface device during the program mode;
after receiving the password, initiate a lock mode of the industrial device/controller in response to detecting an actuation of the keyswitch from the program mode position to the lock mode position;
replace a current password of the industrial device/controller with the received password in response to the lock mode being initiated within a predetermined amount of time after receiving the password; and
maintain the current password of the industrial device/controller and disregard the received password in response to the lock mode not being initiated within the predetermined amount of time after receiving the password.

8. The industrial device/controller of claim 7, wherein the keyswitch is located on the industrial device/controller.

9. The industrial device/controller of claim 7, wherein the at least one processing device is further configured to transmit an indication to the user interface device indicating that the current password of the industrial device/controller has been replaced with the received password after the current password of the industrial device/controller is replaced with the received password.

10. The industrial device/controller of claim 7, wherein the at least one processing device is further configured to transmit a history of unsuccessful password replacement attempts after the industrial device/controller receives the password.

11. The industrial device/controller of claim 7, wherein the at least one processing device is further configured to transmit a command to the user interface device to display a prompt to actuate the keyswitch from the program mode position to the lock mode position.

12. The industrial device/controller of claim 10, wherein the at least one processing device is further configured to transmit a command to the user interface device to display the history of unsuccessful password replacement attempts.

13. An industrial process/safety control and automation system comprising:
a user interface device and an industrial device/controller;
the user interface device configured to:
detect an actuation of a keyswitch from a lock mode position to a program mode position,
activate a password set function in response to detecting the actuation of the keyswitch to the program mode position, and
receive a password for transmission to the industrial device/controller; and
the industrial device/controller configured to:
receive the password from the user interface device,
detect a performance of a physical password replacement authentication procedure comprising actuation of the keyswitch from the program mode position to the lock mode position,
replace a current password with the received password in response to detecting the physical password replacement authentication procedure within a predetermined amount of time after receiving the password; and
maintain the current password and disregard the received password in response to not detecting the physical password replacement authentication procedure within the predetermined amount of time after receiving the password.

14. The system of claim 13, wherein the user interface device is further configured to:
receive a second password in response to activating the password set function; and
transmit the password to the industrial device/controller in response to verifying that the second password matches the current password.

15. The system of claim 13, wherein the industrial device/controller is further configured to transmit an indication to the user interface device indicating that the current password has been replaced with the received password after the current password of the industrial device/controller is replaced with the received password.

16. The system of claim 13, wherein the industrial device/controller is configured to detect the performance of the physical password replacement authentication procedure by detecting an actuation of the keyswitch from the program mode position to the lock mode position after receiving the password.

17. The system of claim 16, wherein the keyswitch is located on the industrial device/controller.

18. The system of claim 13, wherein the industrial device/controller is further configured to transmit a history of unsuccessful password replacement attempts after the industrial device /controller receives the password.

19. The system of claim 13, wherein the industrial device/controller is further configured to transmit a command to the user interface device to display a prompt to actuate the keyswitch from the program mode position to the lock mode position.

20. The system of claim 18, wherein the industrial device/controller is further configured to transmit a command to the user interface device to display the history of unsuccessful password replacement attempts.

* * * * *